(12) United States Patent
Goetz et al.

(10) Patent No.: US 6,604,501 B1
(45) Date of Patent: Aug. 12, 2003

(54) PISTON CONSISTING OF FINEST GRAIN CARBON AND METHOD FOR PRODUCING THE SAME

(75) Inventors: Ulrich Goetz, Buching (DE); Rainer Hegermann, Rosshaupten (DE)

(73) Assignee: Sintec Keramik GmbH & Co. KG, Halblech (DE)

(*) Notice: Subject to any disclaimer, the term of this patent is extended or adjusted under 35 U.S.C. 154(b) by 0 days.

(21) Appl. No.: 09/763,100

(22) PCT Filed: Aug. 20, 1999

(86) PCT No.: PCT/EP99/06120

§ 371 (c)(1), (2), (4) Date: Feb. 16, 2001

(87) PCT Pub. No.: WO00/10937

PCT Pub. Date: Mar. 2, 2000

(30) Foreign Application Priority Data

Aug. 21, 1998 (DE) .......................................... 198 38 021

(51) Int. Cl.$^7$ ............................................. C04B 35/528
(52) U.S. Cl. ........................................................ 123/193.6
(58) Field of Search ........................ 123/193.6; 428/408; 264/29.2

(56) References Cited

U.S. PATENT DOCUMENTS

| | | | | |
|---|---|---|---|---|
| 4,730,548 A | * | 3/1988 | Maeda et al. | .................. 92/225 |
| 5,178,686 A | * | 1/1993 | Schmid et al. | ............... 148/439 |
| 5,525,276 A | * | 6/1996 | Okuyama et al. | ........... 264/29.3 |

FOREIGN PATENT DOCUMENTS

| | | |
|---|---|---|
| DE | 30 34 359 | 8/1980 |
| DE | 44 37 558 | 4/1995 |
| DE | 44 11 059 | 10/1995 |
| DE | 196 28 965 | 1/1998 |
| EP | 0 552 371 | 7/1993 |

OTHER PUBLICATIONS

W.R. Hoffmann et al.: Carbon, vol. 32, Nr. 6, 1994, pp. 1087–1103, XP002124707.

J. Schmidt et al.: Carbon, vol. 36, Nr. 7–8, 1998, pp. 1079–1084 XP004124178.

* cited by examiner

Primary Examiner—Marguerite McMahon
(74) Attorney, Agent, or Firm—Paul Vincent

(57) ABSTRACT

The invention concerns a piston of finest grain carbon, having a bending strength of at least 100 MPa, a bending elongation >0.8%, an average interlayer distance c/2<0.35 nm, an average crystallite size in the c direction >5 nm and a heat conductivity of at least 10 W/mK, and a method for its production comprising: a) compacting of a polyaromatic mesophase powder to almost its final shape; b) heating of the green product at ambient pressure under a non-oxidizing atmosphere to a temperature of between 900 to 1300° C. and maintenance at this temperature; c) high-temperature treatment, thereby heating up to a temperature between 1400 and 2400° C. and holding this temperature for between 2 and 20 hours; d) cooling down of the shaped form to an ambient temperature at less than 4 K/min, and a polyaromatic mesophase powder for the production of such a piston, characterized by a) a portion of quinoline-insoluble components of ≧85 weight %; b) a portion of toluene-insoluble components of ≧90 weight %; wherein c) a shaped form produced from the powder after sintering up to 1000° C. has a mass residue of more than 90 weight % of the mass before sintering.

30 Claims, 3 Drawing Sheets

PISTON CONSISTING OF FINEST GRAIN CARBON AND METHOD FOR PRODUCING THE SAME

BACKGROUND OF THE INVENTION

The invention concerns a piston of finest grain carbon and a method for producing a piston blank and a polyaromatic mesophase powder for producing a piston.

Special aluminum alloys have been used up to now as material for pistons in combustion engines. Disadvantageously, they have relatively large specific mass, require high production accuracy, and nevertheless exhibit high frictional loss.

Carbon pistons have been proposed to obtain pistons having a small specific mass for facilitating mass compensation and reducing the frictional loss. Moreover, exhaust gas contaminants should be reduced.

The development of carbon materials for such combustion engines demanded not only improved mechanical properties but also special thermo-physical properties, in particular high heat conductivity. The reason for the latter requirement is that combustion processes in the cylinder can result in so-called "knocking" in consequence of overheating. Pistons of aluminum alloys have heat conductivities of approximately 140 to 160 W/mK. The development of carbon materials to replace pistons made from aluminum alloys necessarily requires a heat conductivity of at least 60 W/mK. The minimum requirements with respect to bending strength are values of more than 120 MPa in connection with a Weibull parameter of more than 20.

As is known from the technology of producing carbon or graphite materials, the demands for a higher bending strength contradict those for high thermal conductivity. The latter is achieved only through high temperature treatment at temperatures in excess of 2500° C. With such high temperatures, re-crystallization of the graphite matrix considerably impairs the mechanical properties, such as the bending strength.

Carbon or graphite materials have been produced by mixing, compacting and subsequently carbonizing grained carbon materials (such as coke, carbon black or graphite) with a binding agent, usually a thermoplastic resin. To obtain graphitic material, high temperature treatment up to a temperature range of more than 2500° C. follows. This has the above-mentioned disadvantages. DE 30 34 359 C2 proposes the production of carbon materials by pulverizing coke, forming with the addition of binder resin, baking of the shaped body in a first baking stage at 450–700° C., re-impregnating the baked material with resin following an obligatory previous cooling, and subsequently baking the impregnated material in a second baking stage at at least 1000° C. for carbonization, wherein a graphitizing step may follow at a temperature of up to 3000° C.

DE 196 28 965 C2 discloses a method for the manufacture of a hollow tubular body made from carbon having high density, high strength and high heat conductivity. A green body is pressed, carbonized and subsequently graphitized. A self-blocking fine carbon powder, without binder, (preferably a carbon mesophase) having a powder density in accordance with DIN 51 913 of about 1 g/cm$^3$ and with an average grain size between 5 and 20 hydrometer is thereby pre-compressed. The pre-compressed powder is pressed under a pressure of between 50 and 150 MPa about a rigid plunger to generate the hollow green body. The pressure is subsequently reduced steadily at a rate between 0.19 and 6 MPa/Min. For carbonization, the green body is then initially heated in an environment at a rate of 25 K/Min. to a temperature of 200° C. and subsequently up to a holding temperature between 500 and 700° C. at an extremely slow heating speed between 0.05 to 0.5 K/Min. The holding temperature is maintained for a certain holding time. The temperature is then increased to a carbonizing temperature between 800 and 1200° C. at a rate of 0.05 to 1 K/Min. and likewise held at this temperature. The carbon body is subsequently heated to a graphitizing temperature between 2000 and 3000° C. in an inert atmosphere. Although the procedure may be useful for its intended purpose of producing head-shaped hollow bodies, it is not applicable to pistons of motor vehicles. In particular the publication provides only little information concerning strength values resulting from the procedure. No bending values are indicated. The results may be adequate for a container, but certainly not for a motor vehicle piston.

The known method is extremely demanding due to the mixing requirement and, in particular, due to the impregnation with resin, since this requires intermediate cooling after the first baking stage. The extremely long impregnation and heating up times are also inefficient, the latter taking up to several days. The carbon material obtained is not intended for pistons and is not suitable therefor, since the bending strength is far below that which is required.

DE 44 37 558 A1 also describes production of graphite by mixing coke with a resin binder. The disclosed process is also extremely demanding. The coke powder used has an average particle size of 1 μm (which is actually irrelevant from a technical point of view). Mixing with resin must be effected through kneading under increased pressure and the mixture must be cooled down and re-powdered to an average particle size of 4 μm. Compacting of this powder is not possible at an earlier stage. Due to the high final treatment temperature of 2800° C., this material most certainly has a high heat conductivity on the order of 60 W/mK, although this is not stated.

Furthermore, the use of carbon fiber reinforced carbon (CFC) has been proposed (e.g. WO97/32814 A1). Such materials are extremely expensive due to the carbon fibers and also due to the high production costs per se, as the matrix is usually formed by inside pore separation from the gaseous phase. These materials are thus not suited for an economical production of pistons which can compete with aluminum pistons. The behavior during use is also not known.

The production of carbon materials on the basis of polyaromatic mesophase has also been suggested.

Wolf, R. et al, "Development of Binderless Carbon-Mesophase for Production of High Strength Graphites" (Mater.; Funct.Des.; Proc. Eur. Conf. Adv. Processes Appl., 5$^{th}$ (1997), volume 2, 2/341–2/344. Editor(s): Sarton, L. A.; Zeedijk, H. B., Publisher: Netherlands Society for Materials Science, Zwijndrecht, Netherlands) describe carbon materials having a bending strength between 75 and 125 MPa and thermal conductivities of 45 to 60 W/mK as well as 15 W/mK. The materials, having a thermal conductivity of 45 and 60 W/mK, are proposed for use as pistons in combustion engines. They have, however, low bending elongation of e.g. 0.625%, (estimated from the bending strength and the elasticity modulus using Hooke's Law).

Mörgentaler, K. D. "Die Entwicklung einer Technologie für die konturnahe Herstellung von Kolben für Verbrennungsmotoren aus hochfesten Feinstkornkohlenstoffen" (The Development of a Technology for Close-Tolerance Production of Pistons for Combustion Engines of Highly Rigid Finest Grain Carbon) (Werst. Verkehrstech., Editor(s): U. Koch, Publisher: DGM Informationsgesellschaft, Oberursel Symp. 2, Werkstoffwoche '96 (1997) Meeting Date 1996, 67–72) discloses a raw material named CARBOSINT which allegedly has properties similar to those of a polyaromatic mesophase powder. This raw material leads, however, to extremely hard and brittle carbon material. The extensive hardness requires extremely demanding processing such that these carbons are poorly suited for the mass production of pistons which are in any event, unacceptably brittle. CARBOSINT is intended to have a portion of toluene-insoluble components (TI) of 97% and a portion of quinoline-insoluble components (QI) of 57%. Thus, the difference between the toluene-insoluble components and the quinoline-insoluble components is 40%. After sintering, small bodies show a strength between 181 and 197 MPa in the 3 point bending strength test. Isostatically pressed large bodies having a size up to 90×90×110 mm show a strength in the 3 point bending strength test of 148 to 152 MPa after graphitization, wherein processing times of 3 months are required (Chemische Rundschau, Volume 46, Edition 13, page 3; Carbon for Pistons—New Material for Combustion Engines). These results are completely impractical from a technological and economical viewpoint.

According to Wolf, R., "Determination of Suitable Mesophase Powders as Raw Materials for the Industrial Process" (Extended Abstracts, International Carbon Conference, Essen, June 1992, pages 964–966) materials produced through sintering of polyaromatic mesophase powder have bending strengths in the 3 point bending strength test of between 90 or 120 MPa and heat conductivities of 60 or 50 W/mK. The latter case is a boron-containing material having a boron content of 10%. The bending elongation of the materials is only between 0.69 and 0.67%. In all proposals, the piston must be produced from solid material which is not economically competitive with aluminum pistons due to the unacceptably large degree of effort.

Hüttner, W. et al., "Entwicklung von Kolben aus Feinkornkohlenstoff", in Erdöl, Erdgas, Kohle (Development of Pistons from Fine Grain Carbon in Crude Oil, Natural Gas, Coal), volume 2, February 1991, pages 81 ff also discusses fine grain carbon on the basis of mesophase intended to have, without graphitization, a heat conductivity of 45 W/mK at a bending strength of 140 MPa. Carbons without high temperature/graphitization treatment are highly susceptible to oxidation and are thus not suitable as material for pistons.

It is the underlying purpose of the invention to propose a piston for a combustion engine, a method for its production and a suitable starting material which eliminate the above-mentioned disadvantages.

SUMMARY OF THE INVENTION

In accordance with the invention, this object is achieved with a piston of finest grain carbon having a bending elongation of more than 0.8%, an average interlayer distance c/2 of less than 0.35 nm, an average crystallite size in the c direction of more than 5 nm and a heat conductivity of at least 10 W/mK, wherein the piston is preferably derived from a close tolerance quasi-statically compacted piston green product of polyaromatic mesophase which was subjected to high temperature treatment.

To achieve the above-mentioned object, a method for producing a piston blank of finest grain carbon is also proposed comprising the following steps:

a) compacting a polyaromatic mesophase powder into a piston green product, nearly having its final shape, with a portion of quinoline-insoluble components of $\geq 85$ weight %, preferably $\geq 88$ weight %, and with a portion of toluene-insoluble components of $\geq 90$ weight %, preferably $\geq 93$ weight %, wherein a shaped form produced from the powder after sintering at ambient pressure in a non-oxidizing atmosphere up to 1000° C. has a mass residue of more than 90 weight % of the mass before sintering;

b) heating the green product at ambient pressure in a non-oxidizing atmosphere to a temperature between 900 and 1300° C. and maintaining it at this temperature (sintering);

c) carrying out a high temperature treatment of the shaped form generated according to b) while heating to a temperature between 1400 and 2400° C. and maintaining this temperature for 2 to 20 hours (graphitizing); and d) cooling the shaped form to ambient temperature with a cooling speed of less than 4 K/min.

To solve the above mentioned object, the invention furthermore provides a polyaromatic mesophase powder for producing a piston blank which is characterized in that a) it has a proportion of quinoline-insoluble components of $\geq 85$ weight %, preferably $\geq 88$ weight %;

b) a proportion of toluene-insoluble components of $\geq 90$ weight %, preferably of $\geq 93$ weight % and is further characterized in that c) a shaped form produced from the powder after sintering in non-oxidizing atmosphere at a ambient pressure of up to 1000° C. has a mass residue of more than 90 weight % of the mass before sintering.

The invention proposes a piston which has, in addition to the further parameters mentioned in the independent article claim, in particular, high bending elongation of more than 0.8%. A piston of this type has high stability during permanent operation and permits practical use of an economically justifiable piston, produced to nearly have its final shape, for permanent and wide-spread use in combustion engines, combustion machines or reciprocating compressors. The production of such a piston is facilitated, in particular, by the claimed powder and in accordance with the features of the method claims.

The inventive polyaromatic mesophase powder for production of a piston blank looses little mass during sintering. This is important for economic production, since low mass loss permits high speed during sintering which is again a precondition for shaping of the green product to its nearly-final shape. The powder furthermore displays high sintering activity, wherein after sintering, the relevant mechanical properties such as high bending strength and, in particular, excellent bending elongation are obtained. The powder moreover has high crystalline pre-arrangement, wherein the heat conductivity is high, even with high-temperature treatment at relatively low temperatures. This criterion has double importance. Use of the inventive mesophasic powder compared, in particular, to resin-mixed impregnated carbon, is considerably advantageous since after a first baking step or pre-sintering, cooling down is not required for impregnation, rather the shaped form can be further heated up to the sintering temperature after briefly staying at the pre-sintering temperature.

Limitation of the final treatment temperature substantially increases the economical efficiency of the method. Moreover, there is no significant loss in bending strength and bending elongation. The inventive procedure permits a mass production of a carbon piston which can compete with aluminum pistons. Moreover, the temperature treatment, in particular the high temperature treatment for graphitizing, can be effected at relatively low temperatures with a relatively high rate of temperature increase to help reduce production times and thus decrease costs.

In a further preferred embodiment of the invention, the piston has a heat conductivity of more than 20 W/mK, less than 60 W/mK, and preferably less than 45 W/mK. Surprisingly, precisely a piston having a relatively low heat conductivity of less than 60 W/mK or less than 45 W/mK, does not at all display, during permanent use, the disadvantages feared by experts, rather performs perfectly over the long term, as long as the other limitations recited in the independent article claim are satisfied.

In a further preferred embodiment, the piston has a bending strength of at least 120 MPa, preferably more than 140 MPa and a bending elongation of more than 0.9%, preferably more than 1,0%.

In an additional preferred embodiment, the average crystallite size in the c direction is more than 10 nm, preferably more than 15 nm. In a further development, the piston may comprise a proportion, of less than 0.15 weight %, preferably less than 0.1 weight %, of elements catalyzing the oxidation of carbon under operational conditions of the piston, in particular from the group of the transition metals, alkaline and alkaline earth metals. Moreover, the piston may comprise a proportion of less than 2 weight % of elements inhibiting oxidation of carbon under operational conditions of the piston such as boron, silicon and phosphor. The volume weight of the piston is advantageously more than 1.75 g/ccm, preferably more than 1.80 g/ccm.

In a preferred embodiment of the inventive method, a polyaromatic mesophase powder having the above-mentioned properties is used. Pressure treatment of the polyaromatic mesophase powder is thereby preferably carried out at a pressure of at least 80 MPa acting on a green product density of more than 1.25 g/ccm.

During temperature treatment, the green product is usually heated to sintering temperature and maintained at this temperature for a maximum of 120 hours, preferably not more than 50 hours.

In a preferred embodiment, the green product is initially heated up to an intermediate temperature between 350 and 450° C. and held at this temperature for a duration of between 1.5 and 5 hours. Heating to the intermediate temperature of 350 to 450° C. is usually effected in a time period between 4 to 40 hours, preferably within a maximum of 20 hours.

Further heating of the green product from the above mentioned intermediate temperature to the sintering temperature may be effected within 10 to 90 hours, preferably within a maximum of 40 hours.

In a preferred embodiment, the shaped product, heated to sintering temperature, is held at this temperature for up to 10 hours.

The compacted green product is thereby preferably heated with a heating-up speed of 0.1 to 2 K/min. The heating-up and dwell times are considerably less than those of prior art. The invention operates with relatively high heating-up speeds.

In further substantial teaching of the invention, the temperature increase is preferably not effected with constant, rather with differing heating up speeds. The pre-sintered green product is thereby preferably heated to the sintering temperature between 900 and 1300° C. in different temperature regions with different speeds which have a mutual relationship of 1:5 to 1:1, wherein the first temperature range extends to 600° C. and the second temperature range extends to the final sintering temperature.

A preferred embodiment of the invention provides that the sintered shaped form is initially cooled and subsequently graphitized. Towards this end, the shaped form is preferably heated to the graphitizing temperature at a heating speed between 0.1 to 2 K/min.

The blank, which has cooled down after graphitizing, can advantageously be subjected to fine mechanical or fine chemical post-processing to give the piston its final shape and/or for adjusting its properties. The final shaping thereby requires only little post-processing since, due to close-tolerance shaping of the green product, the cooled down blank nearly has its final shape. Post-treatment of the inner hollow space of the blank is, in particular, not required.

A preferred powder in accordance with the invention is characterized by a) a pycnometer density of >1.40 g/ccm;

b) an oxygen content of less than 3 weight %, preferably less than 2 weight %;

c) an incineration residue of less than 0.25 weight %, preferably less than 0.2 weight %;

d) an average grain diameter of the grain distribution cumulative curve d50 between 3 and 12 $\mu$m, preferably between 5 and 10 $\mu$m e) a coarse grain proportion of the grain distribution cumulative curve having a grain diameter of d $\geq$ 20 $\mu$m of less than 5%.

The invention also concerns use of a piston made from finest grain carbon in combustion engines, in particular gasoline, diesel or gas-operated engines, and in reciprocating compressors.

Further preferred embodiments and features of the invention can be extracted from the claims and the following description of preferred embodiments of the invention with reference to the accompanying tables and diagrams.

BRIEF DESCRIPTION OF THE TABLE AND DRAWING

Table 1 shows data of a preferred mesophasic powder;

Table 2 shows properties of pistons after sintering and high temperature treatment;

Table 3 shows data of the piston of example 3, compared to aluminum pistons;

Table 4 shows data of the piston of example 4, compared to aluminum pistons;

Table 5 shows data of the piston of example 5, compared to aluminum pistons;

DESCRIPTION OF THE PREFERRED EMBODIMENT

Figure 1:
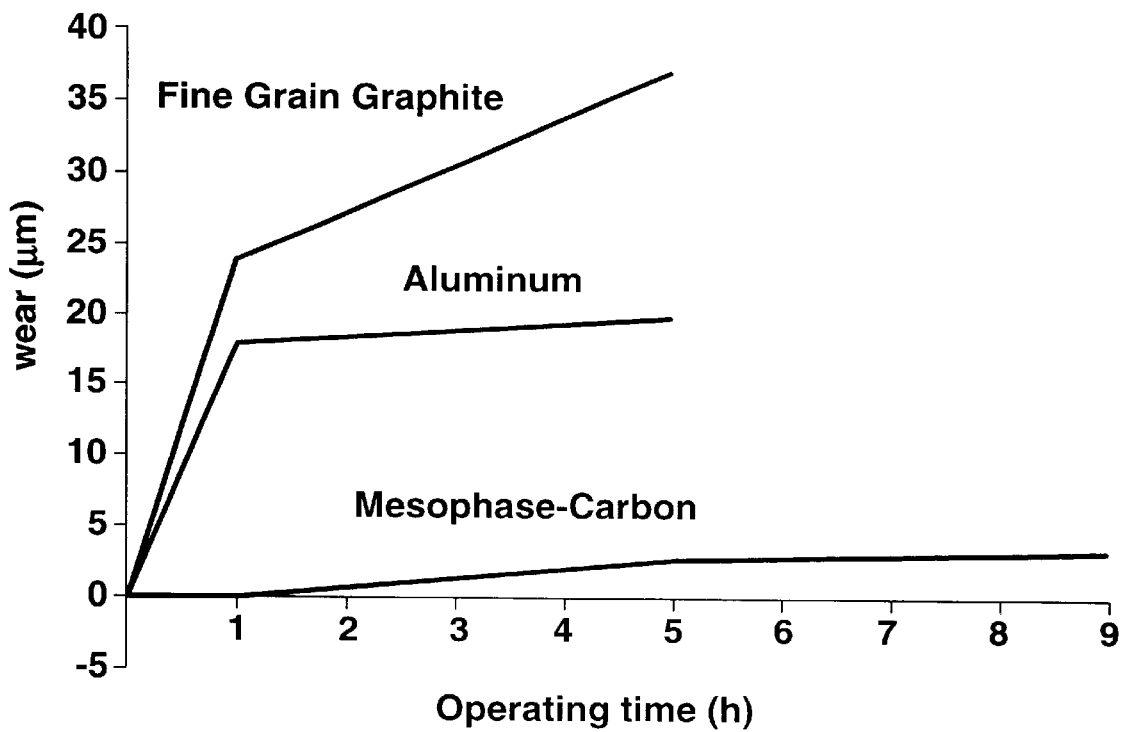
FIG. 1 shows a running time—wear diagram.

Table 1 shows a highly preferred polyaromatic mesophase powder for manufacturing a piston. The mass loss during sintering is not shown in table 1. It depends on the volume of the part to be sintered, the pressure exerted during compacting of the powder and on the heating-up speed during sintering. The preferred powder exhibits, even under the most unfavorable conditions such as with a body density of only 10 mm, a mass loss of significantly less than 10 weight % within a wide range of pressures of e.g. 100 to 200 MPa and within a large range of heating up speeds of e.g. 0.1 to 1.0 K/min after sintering to 1000° C. The mass loss is usually, i.e. under normal conditions for producing pistons, between 9.5 and 9%, which is considerably less than the mass losses in polyaromatic mesophase powder disclosed to date.

Studies of the inventive powder in monoaxially compacted cuboid test bodies having a thickness of approximately 10 mm have been carried out. Compacting was effected with pressures between 100 and 150 MPa and sintering of the test bodies was effected at an ambient pressure in non-oxidizing atmosphere up to 1000° C. with a constant heating up speed of 0.5 K/min. The dwell time at 1000° C. was between 2 and 15 hours. The sintered test bodies were subsequently heated to temperatures between 1800 and 2200° C. at 1 K/min. The dwell time at the final temperature was 2 to 10 hours. They were then cooled down to room temperature at less than 4 K/min. The mechanical properties, heat conductivity and crystalline pre-arrangement were subsequently determined. Mechanical tests showed that the bending strength, compared to that after sintering, remained generally unchanged up to 1800° C. The values were between 115 and 145 MPa. In accordance with the literature, the elasticity modulus displayed a monotonic decrease to 2200° C. The decrease in the elasticity modulus reaches a maximum up to 1800° C. and is associated with a surprising increase in the bending elongation compared to that after sintering. The bending elongation typically increases after sintering from values around 0.5 and 0.65% to values of more than 0.8%, usually to values above 0.9%. With temperatures considerably more than 1800° C., the bending elongation decreases.

On the basis of these findings, the optimum final treatment temperature, with respect to the mechanical properties, is in the range of 1800° C. The heat conductivity of samples was thereby measured after treatment at 1800° C. and displayed heat conductivities between 22 and 35 W/mK in dependence on the compacting of the powder at different pressures and the dwell time at the final temperature of 180° C. Radiographic examinations on the same samples showed average interlayer distances (c/2) of a maximum of 0.346 nm and average crystallite sizes perpendicular to the layer planes (Lc) of a minimum of 10 nm, on average 15 nm. These results confirmed the re-crystallization capability of the carbon produced from the special polyaromatic mesophase powder.

Production of pistons for the engine types mentioned below is based on these findings.

Pistons having a final diameter of approximately 40 and 52 mm were produced for two cycle engines and pistons having a final diameter of approximately 65 mm and 80 mm were produced for four cycle engines. Shaping to the nearly-final shape was carried out though quasi isostatic pressing with pressures between 100 and 150 MPa and sintering of the pistons at an ambient pressure in non-oxidizing atmosphere. The temperature program during sintering was adapted to the size of the pistons. For pistons having a diameter of up to 65 mm, the final temperature of approximately 1000° C. was obtained in less than 1.5 days, for pistons having a diameter of approximately 80 mm, in less than 2 days. This is advantageously achieved with high heating up speeds or short sintering times. These heating up speeds emphasize the economical feasibility of the method in comparison to prior art. After sintering, the pistons were cooled down to room temperature and finished in a high-temperature furnace at 1800° C. Heating up to this temperature was effected in less than one day. Limitation of the final treatment temperature and rapid heating up further contribute to the efficiency of the method. A temperature of 1800° C. poses modest requirements with regard to furnace construction and stresses the furnace considerably less than the conventional final treatment temperatures between 2500 and 3000° C., which are required to obtain a heat conductivity of at least 60 W/mK.

Figure 2:
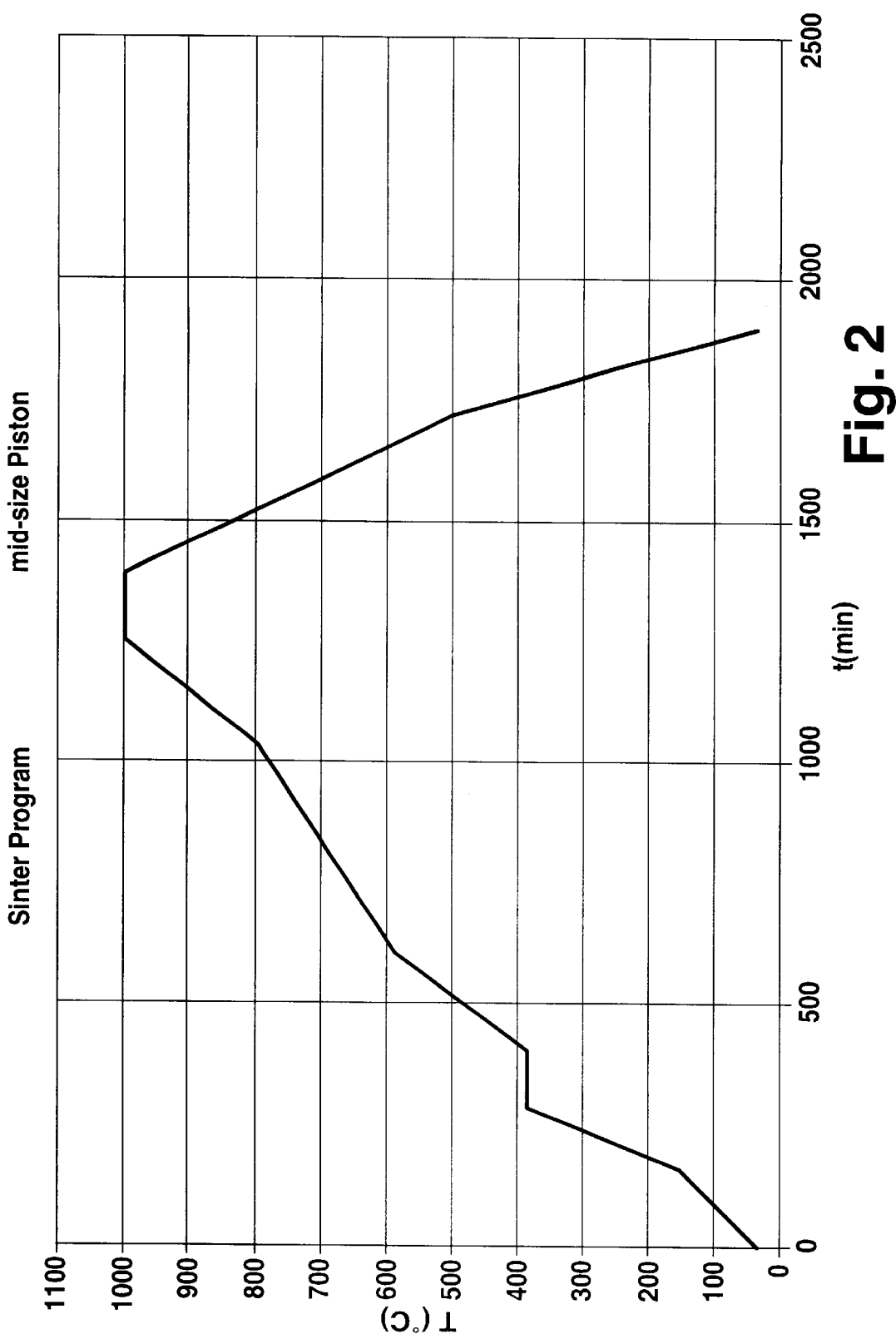
FIG. 2 shows a diagram for a sintering program for small and medium-sized pistons.

A typical temperature program during sintering of the pistons consists of several steps which are carried out successively. An example thereof is the temperature program during sintering of a piston having a diameter of approximately 65 mm (FIG. 2). The temperature was increased from room temperature to a temperature range of around 380° C. with an average speed of approximately 1.4 K/min. The dwell time in this temperature range was 2 hours. Further heating to a temperature range of approximately 600° C. was effected at approximately 1 K/min. The average heating up speed between this temperature range and 1000° C. was approximately 0.8 K/min. The dwell time at 1000° C. was approximately 2.5 hours. Cooling down to room temperature was effected at less than 4 K/min. Sintering was followed by thermal post-treatment with heating up, starting from 1000° C., to 1800° C. at approximately 1 K/min. The dwell time at the final temperature was approximately 5 hours. Subsequent cooling down to room temperature was effected at less than 4 K/min. With pistons having a smaller or larger diameter, the temperature programs were correspondingly adapted. The heating up speeds for pistons having a smaller diameter are correspondingly higher, the dwell times are usually shorter, and vice versa.

Figure 3:
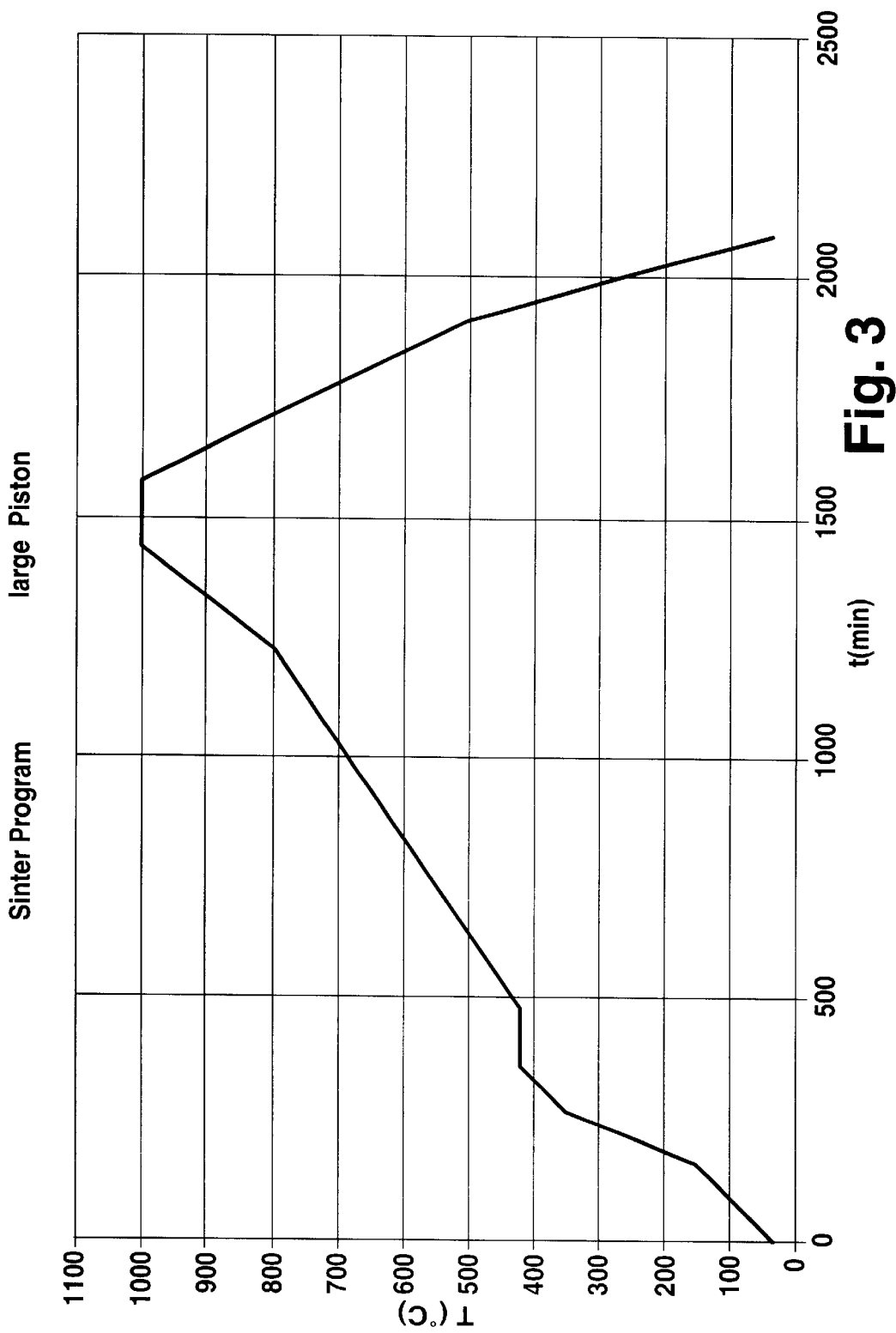
FIG. 3 shows a diagram for a sintering program for large pistons.

FIG. 3 shows a typical sintering program for a piston having a diameter of approximately 80 mm. The temperature dependence in FIG. 3 is substantially similar to that of FIG. 2, with the heating up speeds being slightly less. Moreover, pre-sintering is effected at constant temperature for a certain length of time, at a temperature of slightly more than 400° C. The properties of pistons of various diameters after sintering and high-temperature treatment at 1800° C. are shown in table 2.

The following examples show the results of engine tests with different pistons. These tests yielded surprising results. In contrast to conclusions reached in prior art, all pistons tested, both for two cycle and four cycle engines, showed excellent behavior despite only average heat conductivity. The knocking noises, discussed in literature and caused by average to poor heat conductivity, did not occur. Moreover, significant improvements in engine performance were achieved with significantly reduced emissions in the exhaust gas as well as reduced fuel and oil consumption. Wear measurements showed a minimum initial wear during the first hours which was clearly below that of conventional pistons made from aluminum alloys. Tests under the same conditions (two cycle engine, piston diameter of 52 mm) with a piston of finest grain graphite (not further specified) showed considerably higher initial wear. The favorable performance of the inventive piston must be due to the reduced final treatment temperature.

Concrete test examples are described below.

EXAMPLE 1

A polyaromatic mesophase powder corresponding to table 1 was used and pressed, in a quasi isostatic fashion at a pressure of 120 MPa, into piston blanks having a diameter of 80 mm (for a piston having a final diameter of 65 mm).

The blanks were sintered at ambient pressure in non-oxidizing atmosphere, with the above described heating up program, to a temperature of 1000° C. The results after sintering are shown in table 2. The bending strength reaches a value of slightly less than 140 MPa, the elasticity modulus is still very high at 22.9 GPa, and as a result, the bending elongation is only 0.6%. After treatment at the final temperature of 1800° C., the following results are obtained: The bending strength remains almost unchanged in this case with 137 MPa, the elasticity modulus drops to 14.6 GPa with a bending elongation of 0.94%. The values stated are average values. The transverse rupture rods were prepared from the piston blank, i.e. from the piston head, from the region of the piston boss and the piston shroud. Samples from the piston head and piston shroud showed tolerances in the bending strength of approximately +2% to −4.5%. Pistons which were produced in this fashion were processed to assume (outline) their final dimension (piston diameter 65 mm). The waste pieces were ashed in flowing air at 900° C. to determine the ash content which showed an average value of 0.19±0.04% from three individual samples.

Some pistons were subsequently chemically treated by impregnation with silicon, boron or phosphor containing compounds (polysiloxanes, boron and phosphorous acid or esters thereof). Impregnations of this type are not required for internal reciprocating combustion engines, but are advantageous for lean or diesel engines.

EXAMPLE 2

In accordance with example 1, pistons having a diameter of 52 mm (final diameter) were installed in a two cycle engine. Table 2 shows the properties of the piston. The wear behavior during the initial phase was examined. The results are shown in FIG. 1. The initial wear is considerably less than that of conventional aluminum pistons.

EXAMPLE 3

In accordance with example 1, pistons having a diameter of 65 mm (final diameter) were produced and installed in a four cycle engine for performance tests. The engine was not specifically designed for carbon piston use. The geometry of the carbon piston was adjusted to the properties of carbon compared to the mass produced aluminum piston. The results are shown in table 3. Without optimization of the engine setting, a slight increase in performance can be observed with simultaneous reduced fuel consumption of up to 15%. Reduction of the CO content (vol %) in the exhaust flow is considerably higher than the increase of the $CO_2$ content (vol %). The decrease in the hydrogen carbon proportion (vol %) of the exhaust flow is particularly significant. All exhaust values substantiate the reduced fuel consumption. The engine was loaded up to the maximum rotational speed of 4000 rpm. None of the three pistons examined showed any defects. Engine operation was perfect even after more than 100 hours. Wear could not be detected.

EXAMPLE 4

Pistons were produced according to example 1. The diameter of the pistons was 52 mm (final diameter). They were installed in an air-cooled two cycle engine. Table 4 shows the test results obtained. The performance increased by up to 5% and fuel consumption was also reduced by up to 6%. The ratio between CO and $CO_2$ changes in favor of $CO_2$ without an increase in the sum of both gas portions. Due to the large portion of rinsing gas in the exhaust flow, effective change of the hydrocarbon content cannot be observed. Four pistons were examined. The rotational speed was increased up to 14000 rpm. All pistons yielded the same results without any damage. Wear could not be detected.

EXAMPLE 5

Pistons having a diameter of 65 mm, however produced, as in example 1, with prolonged heating up program, were tested in a four cycle engine. These pistons had a bending strength of 112 MPa and a bending elongation of 0.92%. The test results corresponded to those of example 3. One can conclude from this that even a strength below 120 MPa is sufficient for use in an engine. Analogously, pistons having a diameter of 52 mm with further reduced strength were tested in a two cycle engine. The bending strength was 92 MPa, the bending elongation was 0.89%. This also produced positive results, as is clearly shown in table 5. This also confirms that, for normal engine use, less bending strength is sufficient if the bending elongation is sufficiently large. With reference to rotational speed stability and wear, the results were the same as in examples 3 and 4.

EXAMPLE 6

Within the scope of the screening tests, pistons were also obtained whose bending elongation was in the range between 0.7 to 0.77. All the tests with engines comprising these pistons (piston diameter 52 mm, two cycle engine) resulted in destruction of the piston. In contrast thereto, all subsequent tests with pistons having a bending elongation >0.8% did not lead to destruction of the piston. One must conclude therefrom that a bending elongation of approximately 0.8% represents a critical value. This property is obviously more important than high bending strength.

TABLE 1

| typical data of the mesophasic powder used | | |
|---|---|---|
| Density | g/ccm | 1.42 |
| Toluene-insoluble Components (TI) | weight % | 93 |
| Quinoline-insoluble Components (QI) | weight % | 88.5 |
| TI-QI (beta resins) | weight % | 4.5 |
| Volatile components* | weight % | 9.4 |
| Oxygen content | weight % | 1.6 |
| Ash content | weight % | 0.21 |
| Average particle size | μm | 7.9 |

*after 1000° C.

TABLE 2

Properties of the pistons after sintering (1000° C.) and high-temperature treatment (1800° C.)

| | | Piston diameter | | | |
|---|---|---|---|---|---|
| | | 52 mm 1300° C. | 52 mm 1800° C. | 65 mm 1300° C. | 65 mm 1800° C. |
| Density | g/ccm | not determined | 1.86 | 1.71 | 1.84 |
| bending strength | MPa | — | 141 | 138 | 137 |
| elasticity modulus | GPa | — | 15.1 | 22.9 | 14.6 |
| bending elongation | % | — | 0.93 | 0.6 | 0.94 |

TABLE 3

| Test configuration 1 | | Test configuration 2 | |
|---|---|---|---|
| Pist. No.: Series | Cyl. No.: Series | Piston no. 3 | Cyl. No. series |
| Material: Alu | Material: Alu | Material: Sintec KB 3-4 | Material: Alu |
| Drawing No.: | Drawing No.: | Drawing No.: | Drawing No.: |
| Compression: 5.7 bar | | Compression: 6.1 bar | |
| Compression edge: | | Compression edge: | |

Arithmetic average values of the power test of 2000–4000 min$^{-1}$

| Material | Pe (kW) | TK (° C.) | TFR (° C.) | B (kg/h) | CO (vol %) | CO2 (vol %) | HC (ppm) |
|---|---|---|---|---|---|---|---|
| Alu | 2.62 | 257.80 | 0.00 | 1.22 | 4.94 | 7.18 | 143.60 |
| Sintec KB 3-4 | 2.66 | 264.60 | 0.00 | 1.07 | 3.06 | 8.46 | 54.00 |

Pe = effective power
B = fuel amount
TK = temperature at spark plug

TABLE 4

| Test configuration 1 | | Test configuration 2 | |
|---|---|---|---|
| Piston No.: 3.5 | Cyl. No. 3.5 | Piston no. 13 | Cyl. No. 12.4 |
| Material: Alu | Material: Alu | Material: Sintec KS 7-4 | Material: Alu |
| Drawing No.: STIHL (Mahle original) | Drawing No.: STIHL (Mahle original) | Drawing No.: | Drawing No.: STIHL (Mahle original) |
| Compression: 10 bar (cold) | | Compr.12.1 bar (cold) | |
| Compression edge: 1.0 mm | | Compr. edge: 0.7 mm plug: WSR 4F | |

Arithmetic average values of the power test of 5000–11000 min$^{-1}$

| Material | Pe (kW) | TK (° C.) | TFR (° C.) | B (kg/h) | CO (vol %) | CO2 (vol %) | HC (ppm) |
|---|---|---|---|---|---|---|---|
| Alu | 3.99 | 238.00 | 242.40 | 1.96 | 5.86 | 8.46 | 2754.00 |
| Sintec KS 7-4 | 4.20 | 268.20 | 272.40 | 1.84 | 5.42 | 8.80 | 2854.80 |
| SINTEC KS 7-4 (cooled) | 4.40 | 253.40 | 257.60 | 1.86 | 5.38 | 9.30 | 2686.00 |

Pe = effective power
B = fuel amount
TK = temperature at spark plug

TABLE 5

| Test configuration 1 | | Test configuration 2 | |
|---|---|---|---|
| Piston No.: 3.5 | Cyl. No. 3.5 | Piston no.: 3 | Cyl. No.: 3.5 |
| Material: Alu | Material: Alu | Material: Sintec KS 2-10 | Material: Alu |
| Drawing No.: STIHL (Mahle original) | Drawing No.: STIHL (Mahle orig.) | Drawing No.: | Drawing No.: STIHL (Mahle original) |
| Compression: 10 bar (cold) | | Compression: 12.1 bar (cold) | |
| Compression edge: 1.0 mm | | Compression edge: 0.7 mm | |

TABLE 5-continued

Arithmetic average values of the power test of 9000–11000 min$^{-1}$

| Material | Pe (kW) | TK (° C.) | TFR (° C.) | B (kg/h) | CO (vol %) | CO2 (vol %) | HC (ppm) |
|---|---|---|---|---|---|---|---|
| Alu | 3.99 | 238.00 | 242.40 | 1.96 | 5.86 | 8.46 | 2754.00 |
| Sintec KS 2-10 | 4.45 | 254.20 | 252.00 | 1.91 | 6.18 | 8.52 | 2553.60 |

Pe = effective power
B = fuel amount
TK = temperature at spark plug

We claim:

1. A piston of finest grain carbon comprising:
   a minimum bending strength of 100 MPa;
   a bending elongation of more than 0.8%;
   an average interlayer distance c/2 of less than 0.35 nm;
   an average crystallite size in a c direction of more than 5 nm; and
   a heat conductivity of at least 10 W/mK.

2. The piston of claim 1, wherein said heat conductivity is more than 20 W/mK.

3. The piston of claim 1, wherein said heat conductivity is less than 60 W/mK.

4. The piston of claim 1, further comprising a bending strength of at least 120 MPa.

5. The piston of claim 1, wherein said bending elongation is more than 0.9%.

6. The piston of claim 1, wherein said average crystallite size in the c direction is more than 10 nm.

7. The piston of claim 1, further comprising having a content, of less than 0.15 weight %, of at least one of elements catalyzing oxidation of carbon under operational conditions of the piston and elements selected the group consisting of transition metals, alkaline, and alkaline earth metals.

8. The piston of claim 1, further comprising a content, of up to 2 weight %, of elements inhibiting oxidation of carbon under operational conditions of the piston selected from the group consisting of boron, silicon, and phosphor.

9. The piston of claim 1, further comprising a density which is >1.75 g/ccm.

10. The piston of claim 1, produced by:
   a) quasi static compacting of a piston green product from polyaromatic mesophase to nearly its final shape; and
   b) high-temperature treatment following step a).

11. A use of a piston of finest carbon according to claim 1, in combustion engines.

12. A use of a piston of finest carbon according to claim 1 in reciprocating compressors.

13. The method for the production of a piston blank of finest grain carbon to a near-final shape, the method comprising the steps of:
   a) compressing a polyaromatic mesophase powder into a piston green product having a near-final shape, with a portion of quinoline-insoluble components which is ≧85 weight %, and with a portion of toluene-insoluble components which is ≧90 weight %, wherein a shaped form produced from the powder after sintering at ambient pressure in a non-oxidizing atmosphere up to 1000° C. has a mass residue of more than 90 weight % of a mass before sintering;
   b) heating up said green product at ambient pressure in a non-oxidizing atmosphere to a temperature between 900 to 1300° C. and maintenance at this temperature (sintering);

c) high-temperature treating of a shaped form fashioned according to step b) through heating up to a temperature between 1400 and 2400° C. and maintenance at this temperature for between 2 and 20 hours (graphitizing); and d) cooling down said shaped form to ambient temperature with a cooling down speed of less than 4 K/min.

14. The method of claim 13, wherein said heating of said shaped form to graphitizing temperature in step c) is effected with a heating up speed of between 0.1 and 2 K/min.

15. The method of claim 13, wherein said shaped form is kept at said sintering temperature for up to 10 hours in step b).

16. The method of claim 13, wherein said green product is heated up to said sintering temperature in step b) within a period of not more than 120 hours.

17. The method of claim 13, further comprising first heating of said green product to an intermediate temperature between 350 and 450° C. and maintenance at this temperature for a period between 1.5 and 5 hours.

18. The method of claim 17, wherein said first heating of said green product to said intermediate temperature between 350 and 450° C. Is effected over a time period between 4 to a maximum of 40 hours.

19. The method of claim 17, wherein a further heating of said green product to said sintering temperature is effected over a time period between 10 to a maximum of 90 hours.

20. The method of claim 13, wherein said compressed green product is heated up with a heating speed between 0.1 and 2 K/min.

21. The method of claim 13, further comprising an initial cooling down of a sintered, shaped form following step b), with subsequent graphitization in step c).

22. The method of claim 13, wherein step a) comprises the step of compressing the polyaromatic mesophase powder at a pressure which is at least 80 MPa.

23. A method for producing a piston from a piston blank of finest grain carbon, made according to the method of claim 13, wherein a cooled down blank is subjected to at least one of mechanical and chemical fine, post-treatment to at least one of give the piston a final shape and establish piston properties.

24. The method of claim 16, wherein said green product is heated up to said sintering temperature in step b) within a period of not more than 50 hours.

25. The method of claim 18, wherein said first heating of said green product to said intermediate temperature between 350 and 450° is effected over a time period between 4 to a maximum of 20 hours.

26. The method of claim 19, wherein a further heating of said green product to said sintering temperature is effected over a time period between 10 to a maximum of 40 hours.

27. The method of claim 13, wherein step a) comprises the step of compressing the polyaromatic mesophase powder to a green product density of more that 1.25 g/ccm.

28. The method of claim 13, wherein step b) comprises heating said pre-sintered green product to 600° C. in a first heating step having a first heating speed and then heating said green product to a final sintering temperature lying between 900 and 1300° C. in a second heating step having a second heating speed, wherein a heating speed ratio of said first heating speed to said second heating speed is between 1:5 and 1:1.

29. A polyaromatic mesophase powder, for the production of a carbon piston, the powder comprising:

a portion of quinoline-insoluble components of $\geq 85$ weight %; and a portion of toluene-insoluble components of $\geq 90$ weight %, wherein a shaped form produced from the powder after sintering in non-oxidizing atmosphere at an ambient pressure up to 1000° C. has a mass residue of more than 90 weight % of a mass before sintering.

30. The powder of claim 29, further comprising:

a pycnometer density of $\geq 1.40$ g/ccm;

an oxygen content of less than 3 weight %;

an ashing residue of less than 0.25 weight %;

an average grain diameter of a grain distribution sum curve d50 between 3 and 12 $\mu$m; and a coarse grain portion of said grain distribution sum curve having a grain diameter d $\geq 20$ $\mu$m of less than 5%.

* * * * *